United States Patent
Schiffmann (10) Patent No.: US 12,194,714 B2
(45) Date of Patent: *Jan. 14, 2025

(54) METHOD FOR PRODUCING A MULTILAYER COMPOSITE FILM, MULTILAYER COMPOSITE FILM, AND USE THEREOF

(71) Applicant: Kuhne Anlagenbau GmbH, St. Augustin/Menden (DE)

(72) Inventor: Jürgen Michael Schiffmann, Hennef (DE)

(73) Assignee: Kuhne Anlagenbau GmbH, St. Augustin/Menden (DE)

( * ) Notice: Subject to any disclaimer, the term of this patent is extended or adjusted under 35 U.S.C. 154(b) by 191 days.

This patent is subject to a terminal disclaimer.

(21) Appl. No.: 17/921,860

(22) PCT Filed: Apr. 28, 2021

(86) PCT No.: PCT/EP2021/061052
§ 371 (c)(1),
(2) Date: Oct. 27, 2022

(87) PCT Pub. No.: WO2021/219683
PCT Pub. Date: Nov. 4, 2021

(65) Prior Publication Data
US 2023/0166485 A1 Jun. 1, 2023

(30) Foreign Application Priority Data
Apr. 30, 2020 (DE) .......................... 102020111879.1

(51) Int. Cl.
*B32B 27/08* (2006.01)
*B29C 48/00* (2019.01)
(Continued)

(52) U.S. Cl.
CPC .......... *B32B 27/08* (2013.01); *B29C 48/0018* (2019.02); *B29C 48/08* (2019.02);
(Continued)

(58) Field of Classification Search
CPC ..... B29C 48/0018; B29C 48/08; B29C 48/21; B29C 55/12; B29C 55/14; B29C 55/16;
(Continued)

(56) References Cited

U.S. PATENT DOCUMENTS

| | | |
|---|---|---|
| 5,035,851 A | 7/1991 | Schirmer |
| 9,662,863 B2 | 5/2017 | Lorenzetti et al. |
| 2014/0199505 A1 | 7/2014 | Lorenzetti et al. |

FOREIGN PATENT DOCUMENTS

| | | |
|---|---|---|
| DE | 10227580 A1 | 1/2004 |
| DE | 10254172 A1 | 6/2004 |

(Continued)

OTHER PUBLICATIONS

Impact Plastics, 'What is EVOH and How is it Used in Food Packaging?', URL: https://blog.impactplastics.co/blog/what-is-evoh-and-how-is-it-used-in-food-packaging, Sep. 7, 2018.
(Continued)

*Primary Examiner* — Lawrence D Ferguson
(74) *Attorney, Agent, or Firm* — Dinsmore & Shohl LLP (57) ABSTRACT

A method of manufacturing a coextruded and/or laminated and biaxially oriented composite film and a resulting multilayered film which has improved processability and/or improved recyclability. For this purpose, the method and multilayered film provides a novel combination of the density of various layer components of the composite film and certain manufacturing parameters such as the stretching factors, relaxation factors, relaxation temperatures, and residual stretching factors.

20 Claims, 3 Drawing Sheets

(51) Int. Cl.
| | |
|---|---|
| *B29C 48/08* | (2019.01) |
| *B29C 48/21* | (2019.01) |
| *B29C 55/12* | (2006.01) |
| *B32B 7/02* | (2019.01) |
| *B32B 7/12* | (2006.01) |
| *B32B 27/30* | (2006.01) |
| *B32B 27/32* | (2006.01) |
| *B32B 27/34* | (2006.01) |
| *B32B 37/20* | (2006.01) |
| *B32B 38/00* | (2006.01) |
| *C08J 5/18* | (2006.01) |
| *B29K 23/00* | (2006.01) |
| *B29K 27/00* | (2006.01) |
| *B29K 77/00* | (2006.01) |

(52) U.S. Cl.
CPC .............. *B29C 48/21* (2019.02); *B29C 55/12* (2013.01); *B32B 7/02* (2013.01); *B32B 7/12* (2013.01); *B32B 27/304* (2013.01); *B32B 27/306* (2013.01); *B32B 27/308* (2013.01); *B32B 27/32* (2013.01); *B32B 27/34* (2013.01); *B32B 37/206* (2013.01); *B32B 38/0012* (2013.01); *C08J 5/18* (2013.01); *B29K 2023/086* (2013.01); *B29K 2027/08* (2013.01); *B29K 2077/00* (2013.01); *B32B 2038/0028* (2013.01); *B32B 2250/24* (2013.01); *B32B 2307/518* (2013.01); *B32B 2307/72* (2013.01); *B32B 2307/7244* (2013.01); *B32B 2307/734* (2013.01); *B32B 2323/04* (2013.01); *B32B 2323/10* (2013.01); *B32B 2329/04* (2013.01); *B32B 2331/04* (2013.01); *B32B 2333/08* (2013.01); *B32B 2333/12* (2013.01); *B32B 2439/70* (2013.01); *C08J 2323/02* (2013.01); *C08J 2327/08* (2013.01); *C08J 2329/04* (2013.01); *C08J 2377/06* (2013.01)

(58) Field of Classification Search
CPC .......... B29K 2023/086; B29K 2027/08; B29K 2077/00; B32B 2038/0028; B32B 2250/24; B32B 2307/30; B32B 2307/50; B32B 2307/518; B32B 2307/72; B32B 2307/7244; B32B 2307/734; B32B 2323/04; B32B 2323/10; B32B 2329/04; B32B 2331/04; B32B 2333/08; B32B 2333/12; B32B 2439/70; B32B 27/08; B32B 27/16; B32B 27/30; B32B 27/304; B32B 27/306; B32B 27/308; B32B 27/32; B32B 27/34; B32B 27/36; B32B 37/206; B32B 38/0012; B32B 7/02; B32B 7/12; C08J 2323/02; C08J 2327/08; C08J 2329/04; C08J 2377/06; C08J 5/18
See application file for complete search history.

(56) References Cited

FOREIGN PATENT DOCUMENTS

| | | |
|---|---|---|
| DE | 19916428 B4 | 6/2004 |
| DE | 10048178 B4 | 12/2005 |
| DE | 102006036844 B3 | 1/2008 |
| DE | 102006046483 A1 | 4/2008 |
| EP | 1190847 A1 | 3/2002 |
| EP | 0476836 B2 | 7/2004 |
| EP | 1084035 B1 | 7/2005 |
| EP | 1985444 A1 | 10/2008 |
| EP | 2401148 B1 | 1/2013 |
| EP | 3348491 A1 | 7/2018 |
| JP | H04-164640 A | 6/1992 |
| JP | H04-164641 A | 6/1992 |
| JP | 2000-007026 A | 1/2000 |
| JP | 2004-216565 A | 8/2004 |
| JP | 2010-149476 A | 7/2010 |
| JP | 2011-131391 A | 7/2011 |
| JP | 2014-531341 A | 11/2014 |
| JP | 2017-052524 A | 3/2017 |
| JP | 2017-532261 A | 11/2017 |
| WO | 2019243456 A1 | 12/2019 |

OTHER PUBLICATIONS

Matweb, 'Overview of materials for Ethylene Vinyl Alcohol (EVOH)', [URL: https://www.matweb.com/search/datasheet.aspx?matguid=744899e4ab06482da9cf86d8f450db0d&ckck=1, Published before Apr. 30, 2020.

Japanese Office Action dated Nov. 28, 2023, issued to JP Application No. 2022-565644.

DE Office Action dated Nov. 17, 2020 pertaining to DE application No. 10 2020 111 879.1 filed Apr. 30, 2020 (translated and original versions), 14 pages.

International Search Report, International Preliminary Report on Patentability and Written Opinion dated Aug. 5, 2021 pertaining to PCT international application No. PCT/EP2021/061052 filed Apr. 28, 2021 (translated and original versions), 18 pages.

Savic, Z., Savic. I, "Sausage Casings", VICTUS Lebensmittelindustriebedarf Vertriebsgesellschaft m. b. H., Vienna, 1st edition, 2002, chapter 7, subchapter 4.2, pp. 267 to 270, in particular Figs. 7-13a and 7-13b (4 pages).

Japanese Office Action dated Jun. 11, 2024, issued to counterpart JP Application No. 2022-565644.

METHOD FOR PRODUCING A MULTILAYER COMPOSITE FILM, MULTILAYER COMPOSITE FILM, AND USE THEREOF

CROSS-REFERENCE TO RELATED APPLICATIONS

The present application is the National Phase entry of International Patent Application No. PCT/EP2021/061052 filed Apr. 28, 2021, which claims priority to German Patent Application No. 10 2020 111 879.1 filed Apr. 30, 2020, the entire contents of which are hereby incorporated by reference into this application.

TECHNICAL FIELD

The present disclosure relates to coextruded and biaxially oriented multilayer films, which can be used, for example, as packaging materials, in particular for food products, a method for manufacturing the same and their use, for packaging a food product, a luxury food product or a liquid or solid, in particular powdery, good. However, the present disclosure also relates to laminated multilayer films and corresponding manufacturing processes.

BACKGROUND

On the one hand, laminated multilayer films are known from the state of the art, which are used in packaging materials. Thus, laminates consisting of at least two or three or even more independently produced layers are widely used in the packaging market. A distinction is made between the so-called "duplex" laminate films and the so-called "triplex" laminate films. "Duplex" laminate films are films extruded by the cast or blow process, including barrier films with 5, 7 or 9 layers, which are laminated (bonded or adhered) together in a separate process with a biaxially oriented film of either polyethylene terephthalate (PET), polyamide (PA) or polypropylene (PP), again produced separately. So far, only with these films produced and laminated in successive, separate process steps can the sum of the desired and/or required properties be achieved. For example, two of the required properties (sealability and oxygen or aroma barrier) are achieved by the portion of the extruded mono or multilayer film, and other properties such as printability, heat resistance and mechanical strength are achieved by the portion of the film that is separately biaxially oriented. In addition, it is also common practice to specifically achieve or increase the oxygen barrier by metallization applied in a further process step.

Examples of Duplex Films Commonly Used in the Market:

| Film type | Oxygen barrier |
| --- | --- |
| BOPP/PE | none/low |
| BOPA/PE | none/low |
| BOPET/PE | none/low |
| BOPP/Metallization/PE | through metallization |
| BOPA/Metallization/PE | through metallization |
| BOPET/Metallization/PE | through metallization |
| BOPET/PE-HV-EVOH-HV-PE | by barrier layer such as EVOH |
| BOPET/PE-HV-PA-EVOH-PA-HV-PE | by barrier layer such as EVOH |

| Duplex film | Heat resistance/melting temperature of the outermost layer | Printability | Shrinkage at 90° C. |
| --- | --- | --- | --- |
| BOPP/met/PE | 164° C. | 32 dyn/cm (32·10$^{-3}$ N/m) | 1-2% |
| BOPET/met/PE | 250° C. | 43 dyn/cm (43·10$^{-3}$ N/m) | 0-1% |
| BOPET/5-layer barrier film (PE/HV/EVOH/HV/PE) | 250° C. | 43 dyn/cm (43·10$^{-3}$ N/m) | 0-1% |
| BOPET/7-layer barrier film (PE/HV/PA/EVOH/PA/HV/PE) | 250° C. | 43 dyn/cm (43·10$^{-3}$ N/m) | 1-2% |

The "triplex" laminating film is similar, wherein the sum of the desired and/or required properties is produced with three films manufactured separately and being laminated (bonded or adhered) to each other later on.

In this case, a biaxially oriented film made of PET, PA or PP is laminated with a separate aluminum foil, and this composite is in turn laminated with an extruded cast or blown film.

Here, the extruded cast or blown film takes on the task of sealability, the aluminum foil the task of a barrier and the biaxially oriented film the task of optimum printability, thermal resistance and mechanical strength. The disadvantage of laminating films, however, is that their manufacturing is by nature complex, resource-consuming and expensive, and the entire film composite is often very thick, since a plurality of films must first be manufactured separately and these must then be bonded or adhered in several successive process steps by hotmelt or liquid adhesive to ultimately obtain a laminated multilayer film.

Examples of Triplex Film Commonly Used in the Market:

| Film type | Oxygen barrier |
| --- | --- |
| BOPP/Alu/PE | through aluminum foil |
| BOPA/Alu/PE | through aluminum foil |
| BOPET/Alu/PE | through aluminum foil |

| Triplex film | Heat resistance/melting temperature of the outermost layer | Printability | Shrinkage at 90° C. |
| --- | --- | --- | --- |
| BOPP/Alu/PE | 164° C. | 32 dyn/cm (32·10$^{-3}$ N/m) | 0% |
| BOPA/Alu/PE | 220° C. | 43 dyn/cm (43·10$^{-3}$ N/m) | 0% |
| BOPET/Alu/PE | 250° C. | 43 dyn/cm (43·10$^{-3}$ N/m) | 0% |

Figure 1:
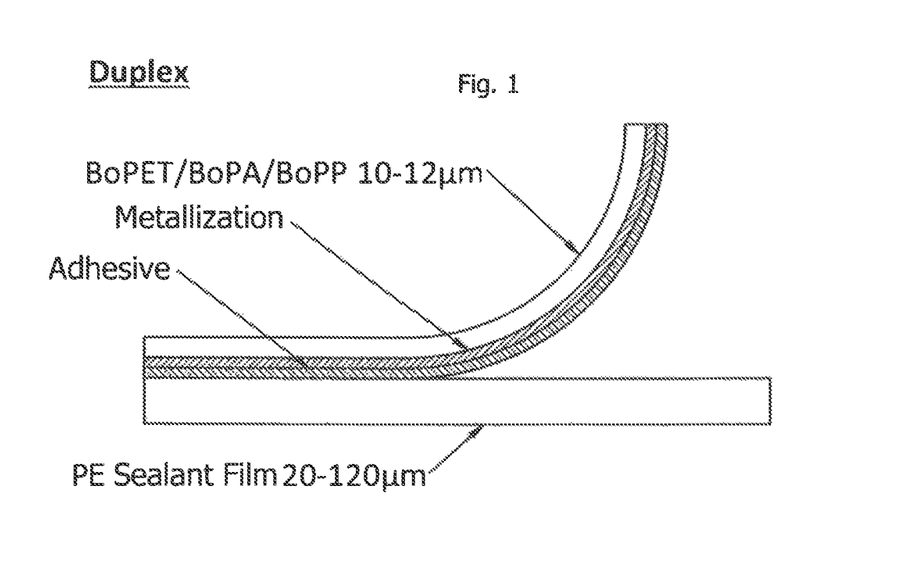
FIG. 1 illustrates a side view of a first duplex film.
Figure 2:
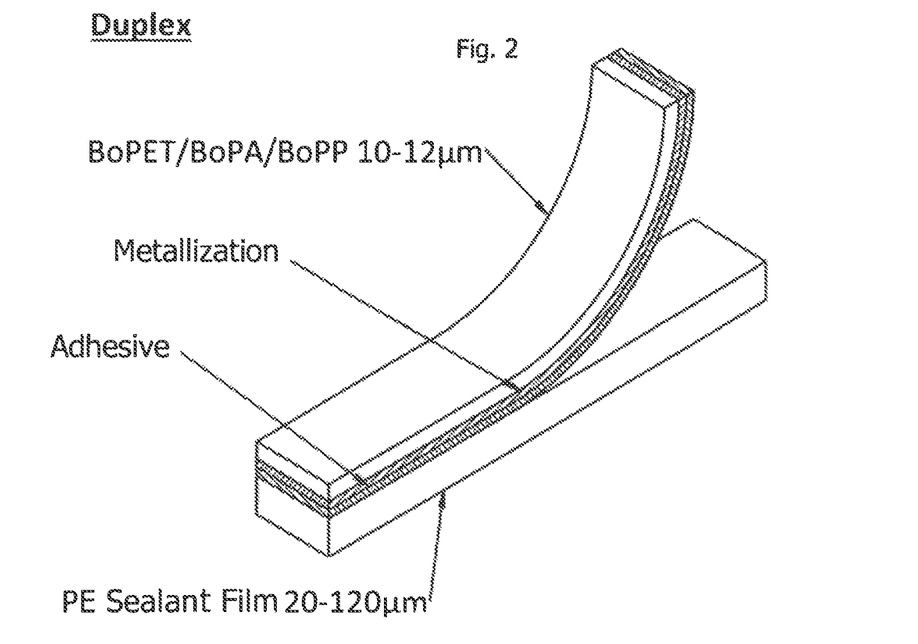
FIG. 2 illustrates a perspective view of the first duplex film of FIG. 1.
Figure 3:
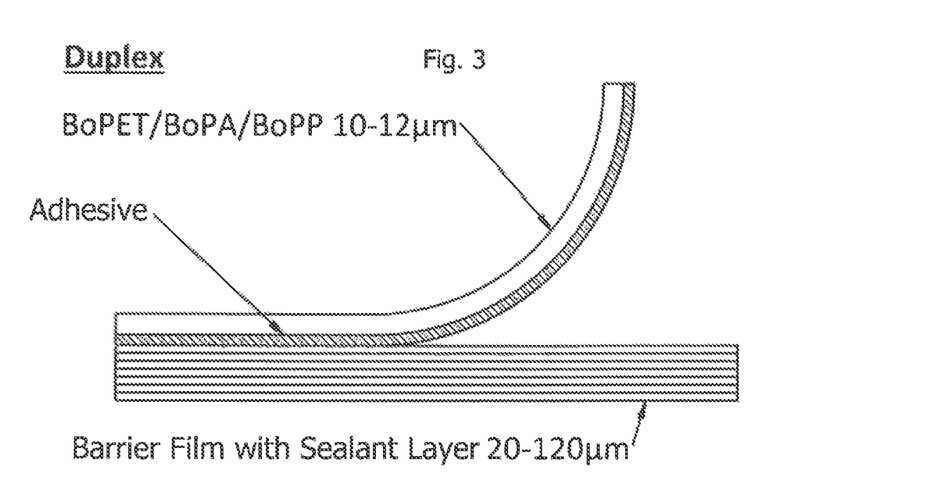
FIG. 3 illustrates a side view of a second duplex film.
Figure 4:
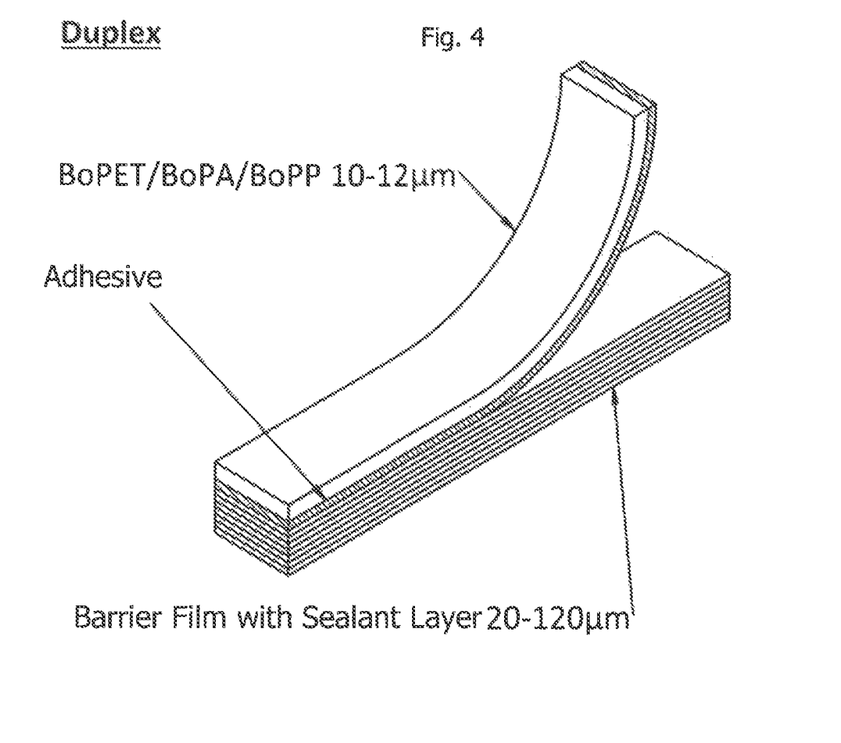
FIG. 4 illustrates a perspective view of the second duplex film of FIG. 3.
Figure 5:
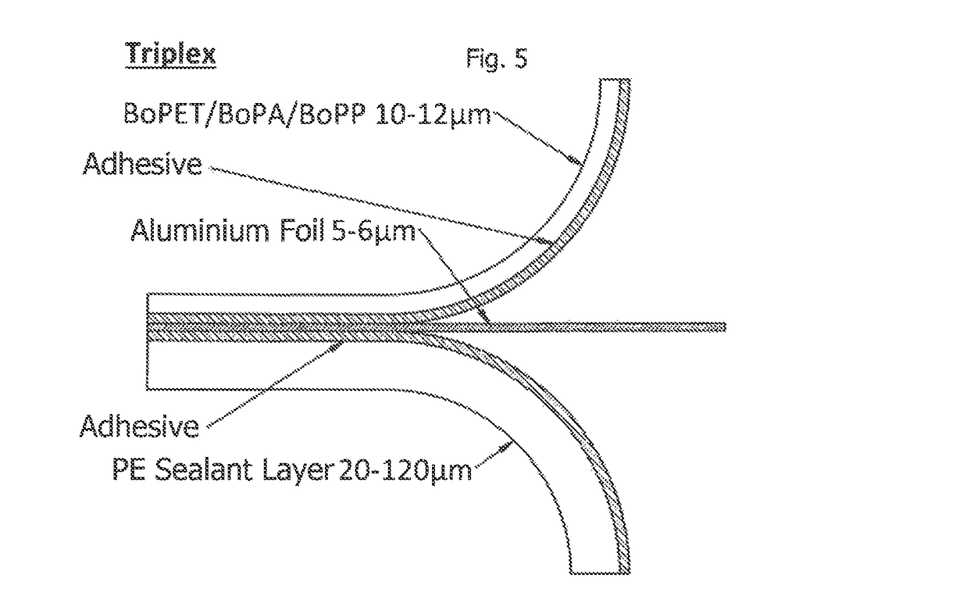
FIG. 5 illustrates a side view of a triplex film.
Figure 6:
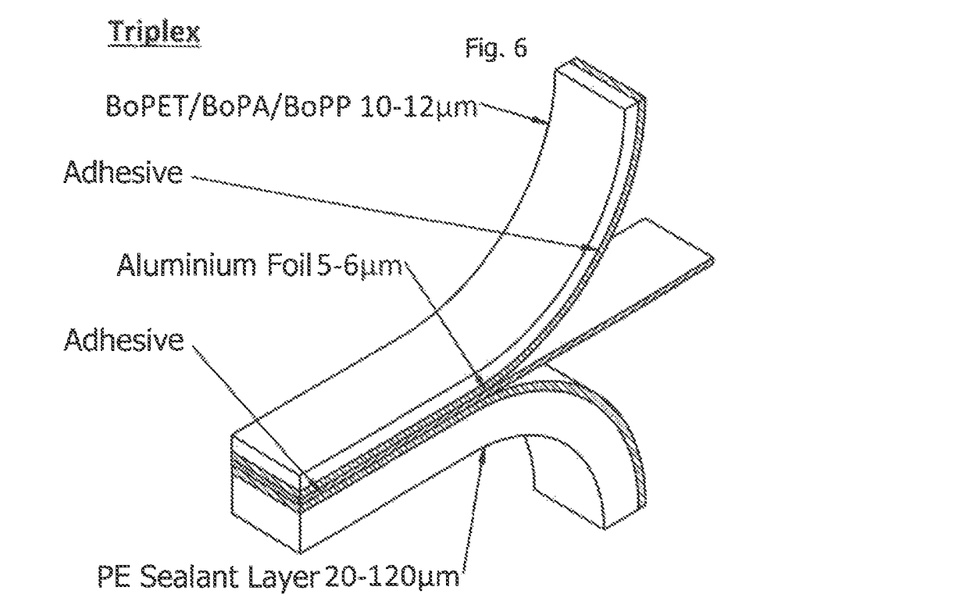
FIG. 6 illustrates a perspective view of the triplex film of FIG. 5.

Known duplex and triplex films are shown in FIGS. 1 to 6.

On the other hand, multilayer films are known from the state of the art, which are manufactured by rcoextrusion and biaxial stretching. The manufacturing processes used for this purpose allow a multilayer film to be manufactured in just one process step by coextrusion, wherein subsequent bonding/laminating of individual film layers with the associated disadvantages is completely eliminated. At most, biaxial stretching of the coextruded raw multilayer film is carried out in order to achieve the desired sum of properties (sealability, thermal resistance, barrier, mechanical strength, printability). Apart from sealability, most of the required properties such as mechanical strength, thermal resistance, printability and barrier (i.e. the oxygen or gas barrier) are achieved by using raw materials such as PET, PA, ethylene-vinyl alcohol copolymer (EVOH), polyvinyl alcohol (PVOH) or polylactic acid (PLA).

Thus, materials such as EVOH, PVOH, PVDC and PA are used for obtaining the oxygen or gas barrier, but materials such as PET or PLA also provide a significantly better barrier protection compared to polyolefin-based raw materials such as PE or PP, especially after stretching, ideally even after biaxial stretching.

In addition, PET and PA in particular are used in the outermost layer of films to achieve particularly good thermal resistance and printability, especially after biaxial stretching.

In addition to their thermal resistance, printability and good barrier properties against gas and oxygen, PA and PET in particular also make a decisive contribution to maintaining the desired mechanical strength, again especially after biaxial stretching.

Thus, numerous composites relating to this are known from the state of the art, such as: DE 10 227 580 A1, DE 10 254 172 A1, DE 10 2006 046 483 A1, DE 10 2006 036 844 A1, EP 0 476 836 B2, EP 1 190 847 B1, EP 1 084 035 B1, and EP 1 985 444 A1.

However, the embodiments and methods known from the state of the art have one thing in common, namely all these coextruded multilayer barrier films generally comprise a relatively large shrinkage of usually more than 20%, in any case always more than 5%, respectively in the machine direction (MD) and in the transversal direction (TD), which is useful for many applications, such as shrink bags/lidding films or cover films.

Examples of Coextruded Films Frequently Used in the Market:

|   | Film type | Application |
|---|-----------|-------------|
| 1 | EVA/PVDC/EVA | a |
| 2 | PE/EVOH/PE | a |
| 3 | PP/EVOH/PP | b |
| 4 | PA/EVOH/PA/PE | a, b |
| 5 | PE/PA/EVOH/PA/PE | a, b |
| 6 | PA/PE/PA/EVOH/PA/PE | a, b |
| 7 | PET/PE/PA/EVOH/PA/PE | a, b |
| 8 | PET/PP/PA/EVOH/PA/PE | a, b |

|   | Application | Film type | Shrinkage MD + TD |
|---|-------------|-----------|-------------------|
| a | Shrink bag for meat or cheese | 1, 2, 4, 5, 6, 7, 8 | 25-50% |
| b | Lidding films for meat or cheese trays | 3, 4, 5, 6, 7, 8 | 5-20% |

| Coextruded biaxially oriented film (without radiation crosslinking and coating) | Heat resistance/melting temperature of the outermost layer | Printability | Shrinkage at 90° C. |
|---|---|---|---|
| Shrink Film EVA/PVDC/EVA | 93° C. | 32 dyn/cm (32·10⁻³ N/m) | 40-50% |
| Shrink film PE/EVOH/PE | 118° C. | 32 dyn/cm (32·10⁻³ N/m) | 30-40% |
| Lidding film PP/EVOH/PP | 164° C. | 32 dyn/cm (32·10⁻³ N/m) | 5-15% |
| Lidding film PET/PE/EVOH/PE | 250° C. | 43 dyn/cm (43·10⁻³ N/m) | 10-20% |
| Lidding film PET/PE/PA/EVOH/PA | 250° C. | 43 dyn/cm (43·10⁻³ N/m) | 5-15% |

However, multilayer barrier films manufactured by coextrusion or lamination and biaxial stretching, which comprise relatively little or no shrinkage (less than 5% or less than 3%), respectively in the machine direction (MD) and in the transversal direction (TD), and which have sufficient barrier, sealability, thermal resistance, mechanical strength and printability, are still lacking.

Furthermore, in many conventional composite films, processability and/or recyclability or recyclability leaves much to be desired.

SUMMARY

It is therefore an object of the present disclosure to provide a method for manufacturing a coextruded and/or laminated and biaxially oriented composite film, such as a coextruded and/or laminated and biaxially oriented multilayer barrier film, and a resulting multilayer film, such as a multilayer barrier film, which comprises improved processability and/or improved recyclability. In some embodiments, the composite film according to the present disclosure additionally comprises at least one of the following properties, and in some embodiments, all of the following properties: sufficient oxygen and/or water vapor barrier, sealability, thermal resistance, printability and mechanical strength, even without a further lamination process. In some embodiments, the composite film according to the present disclosure further comprises a relatively small or no shrinkage (less than 5%, in some embodiments less than 3%) in the machine direction (MD) and in the transversal direction (TD), respectively.

BRIEF DESCRIPTION OF THE DRAWINGS

The present disclosure will be described below, with reference to the attached drawing in which.

DETAILED DESCRIPTION OF THE DISCLOSURE

This object is solved by the following subject-matter and those defined in the claims. According to the present disclosure, a coextruded and/or laminated and biaxially oriented composite film is proposed whose outermost layer (a) consists of or contains EVOH. Furthermore, a corresponding manufacturing method and a use of the composite film are proposed. Regarding the coextruded and biaxially oriented composite film according to the present disclosure, in some embodiments it is not laminated. Accordingly, in the method of manufacturing the multilayered composite film according to the present disclosure, it may be provided that this method does not comprise a step of laminating.

According to the present disclosure, a method for manufacturing a multilayered composite film is proposed, wherein the method includes at least the following steps:
- a step of co-extruding and/or laminating at least three layers (a), (b) and (c) of which
  - the layer (a) forms an outward surface of the composite film or forms a surface of the composite towards the outside;
  - the layer (c) forms a surface of the composite film facing or coming in contact with a good to be packaged; and
  - the layer (b) is disposed between the layer (a) and the layer (c);
  - wherein the layer (b) consists of a single layer or a plurality of layers (b1, b2, b3, b4, . . . ), such as two, three or four layers;
- a step of stretching the co-extruded or laminated composite film; and
- a step of relaxing the oriented or stretched composite film;
- wherein the stretching is bi-axial;
- wherein a stretch factor in the machine direction or longitudinal direction (MD) is at least 2.0;
- wherein a stretch factor in the transversal direction (TD) is at least 2.0;
- wherein the sum of the stretch factor in the machine direction (MD) and the stretch factor in the transversal direction (TD) is at least 5.0;
- wherein the composite film has a temperature of 70 to 130° C. during stretching;
- wherein a relaxation factor in the machine direction (MD) is more than 0.00;
- wherein a relaxation factor in the transversal direction (TD) is more than 0.00;
- wherein the sum of the relaxation factor in the machine direction (MD) and the relaxation factor in the transversal direction (TD) is at least 0.05 (=5%), at least 0.1 (=10%), at least 0.2 (=20%), or at least 0.4 (=40%);
- wherein the composite film has a temperature of 60 to 180° C., 60 to 150° C., 60 to 120° C., or 80 to 100° C., during relaxation;
- wherein a dwell time during relaxation, such as during relaxation under temperature, is at least 2 seconds, or more than 5 seconds, or the duration of relaxation is at least 2 seconds, or more than 5 seconds;
- wherein a dwell time during relaxation, such as during relaxation under temperature, is at most 30 seconds, at most 20 seconds, or at most 10 seconds, or the duration of relaxation is at most 30 seconds, at most 20 seconds, or at most 10 seconds;
- wherein a residual stretch factor in the machine direction (MD) is at most 5.0;
- wherein a residual stretch factor in the transversal direction (TD) is at most 5.0;
- wherein the layer (a) comprises or consists of ethylene-vinyl alcohol copolymer (EVOH) having a density of at least 1.12 g/cm$^3$;
- wherein the layer (b) or the plurality of layers (b1, b2, . . . ) each comprises or consists of a thermoplastic resin having a density greater than 1.00 g/cm$^3$; and
- wherein the layer (c) comprises or consists of a thermoplastic resin having a density of less than 0.95 g/cm$^3$.

To date, no composite film is known from the state of the art in which EVOH has been used as a layer component in the outermost layer (a), or in which the layer (a) would consist of EVOH. The use of EVOH as a material having an oxygen barrier is known from the prior art. However, a use for this purpose requires an inside position/arrangement of EVOH, since EVOH quickly loses its good oxygen barrier properties due to moisture penetration. Therefore, EVOH has ever been used as a layer component or layer material only sandwiched on both sides by protective layers, such as polyolefin or polyamide, which comprise a high water vapor barrier. However, the use of EVOH in generic composite films for a different purpose and in a different manner or in a different arrangement, for example as an outermost or sealant layer (innermost layer; surface to the good to be packaged), has not been known to date.

In contrast, according to the present disclosure, EVOH is deliberately used in the layer (a), i.e. in the outermost layer representing an outward surface of the composite. In this case, the outermost layer (a) contains EVOH or even consists thereof. However, in providing EVOH in the outermost layer (a), it is not the property of EVOH as an oxygen barrier that plays a role. Rather, it was surprisingly found that the use of EVOH in the outermost layer significantly increases the recyclability of the film, for example, compared to conventional composite films that comprise outermost layers containing PA or PET. This is because the EVOH comprises a lower melting temperature compared to the PA and PET materials previously provided in the outermost layer, so that the difference in melting temperatures between the outermost layer and the sealant layer (innermost layer) is reduced. Thereby, the overall melting temperature required for recycling can be reduced, which improves the recyclability of the composite film.

In addition, the inventors have found that the EVOH in the outermost layer can further improve the mechanical properties, such as stiffness and printability, of the film compared to polyolefins, such as PE or PP. For example, the higher melting temperature of the EVOH, especially compared to these polyolefins, leads to an overall improvement in the further processability of the composite film.

In the composite film according to the present disclosure, the EVOH used in layer (a) comprises a density of 1.12 g/cm$^3$ or more, 1.13 g/cm$^3$ or more, or between 1.13 and 1.22 g/cm$^3$. The EVOH used according to the present disclosure comprises a monomer content of ethylene of 48 mol % or less, or 24 to 44 mol %. Thereby, the melting temperature of the EVOH is 160° C. or higher, 180° C. or higher, or 190° C. or higher. According to the present disclosure, the EVOH has a higher melting temperature than the resin of the layer (c).

From the state of the art as well as use in practice, it has been found that materials such as PET and PA in the outermost layer have proven to be suitable for achieving the best possible printability and maintaining the highest possible thermal resistance. However, materials such as PLA or EVOH are also far more suitable from the point of view of printability, thermal resistance, further processability than polyolefin-based raw materials such as PE or PP.

| Raw material | Heat resistance melting temperature DSG (ISO 11357) |
|---|---|
| Homo-PET | 250° C. |
| PA6 | 220° C. |
| PLA | 210° C. |
| EVOH (32 mol %) | 183° C. |
| HD-PE | 131° C. |
| Homo PP | 164° C. |

| Raw material | EVA 28% | EVA 18% | EVA 12% | LLDPE | mLLDPE | random Co-PP | Co-PP |
|---|---|---|---|---|---|---|---|
| VST (° C.) DIN EN ISO 306 | 40-50 | 60-70 | 70-85 | 100-120 | 100-120 | 100-120 | 120-140 |

| Raw material | EVOH | PLA | PA6.66 | PA6 | Co-PET | homo PET |
|---|---|---|---|---|---|---|
| VST (° C.) DIN EN ISO 306 | 155-175 | 160-180 | 180-200 | 190-210 | 210-230 | 240-260 |

| Raw material | Printability or Polarity Surface tension (dyn/cm) (=$10^{-3}$ N/m) |
|---|---|
| PE | 30-32 |
| PP | 30-32 |
| PET | 43 |
| PA | 43 |

To obtain the sufficient barrier against oxygen or gas, raw materials such as PET, PA, EVOH, PVOH and PVDC have been established.

| | Oxygen barrier | |
|---|---|---|
| | 65% rel. humidity $\frac{cm^3}{m^2 \times d * bar}$ | 80% rel. humidity $\frac{cm^3}{m^2 \times d * bar}$ |
| Raw material | | |
| EVOH (PE 32 mol %) | 0, 5 | 1, 2 |
| EVOH (PE 44 mol %) | 1 | 2, 3 |
| PVDC (extrusion resin) | 4 | 4 |
| PVDC (dispersion resin) | 10 | 10 |
| PAN | 8 | 10 |
| PET | 50 | 50 |
| PA6 | 35 | 50 |
| PVC | 240 | 240 |
| PE-HD | 2500 | 2500 |
| PP | 3000 | 3000 |
| PE-LD | 10000 | 10000 |
| EVA | 18000 | 18000 |

Source: Oxygen permeability at 20° C., measured for various barrier plastics (according to Kyoichiro; from: Joachim Nentwig, Kunststoff-Folien, 3rd edition, 2006, Carl Hanser Verlag; Table 26).

But as is known among experts, the barrier property of most of these raw materials is only sufficient if they are appropriately protected against moisture.

Therefore, if these raw materials are to provide barrier, they are always used in one of the middle or innermost layers of a film.

In order to obtain the best possible sealability, polyolefin-based raw materials, such as PE or PP, or similar, which comprise the lowest possible sealing temperature or melting temperature, should be used in any case, as is known from practical experience.

| Raw material | Melting temperature of sealing materials (ASTM D3418) |
|---|---|
| EVA 12% | 93° C. |
| EVA 18% | 84° C. |

-continued

| Raw material | Melting temperature of sealing materials (ASTM D3418) |
|---|---|
| POP | 95° C. |
| mLLDPE | 118° C. |
| RaCoPP | 132° C. |

It is striking that the raw materials ideally used to achieve properties such as thermal resistance, printability and the oxygen barrier, also have a much higher strength, especially after biaxial stretching, than polyolefins are by far not capable of, even despite biaxial stretching.

In an optimum layer structure, the oxygen barrier layer should consequently consist of EVOH, PVOH or PA and be disposed or arranged in one of the middle or intermediate layers, and the sealant layer, consisting of a heat-sealable polyolefin, in the innermost layer.

The outermost layer can therefore also contain portions of thermal resistance and printability materials such as PET or PA.

A closer look at the materials for properties such as thermal resistance, printability, oxygen barrier, as well as strength, reveals that all materials comprise various common features, for example, they all have a density of more than 1.0 g/cm$^3$, they are all polar materials, and they almost all have a melting temperature of more than 160° C., in particular of more than 170° C.

Further consideration of the raw materials to be used as sealant layer in some embodiments also reveals that they all comprise a density of less than 0.95 g/cm$^3$ and a melting temperature<120° C.

| Raw material | Density (g/cm$^3$) |
|---|---|
| PET | 1.33 to 1.4 |
| PA | 1.12 to 1.14 |
| PLA | 0.124 to 0.125 |
| EVOH | 1.12 to 1.22 |

-continued

| Raw material | Density (g/cm³) |
|---|---|
| PE | 0.89 to 0.96 |
| PP | 0.895 to 0.915 |

Not all of these raw materials with a density of more than 1.0 g/cm³ are equally ideal for printability, like PA or PET, or thermal resistance, like PET or PA. Nor do they all comprise an equally high oxygen barrier like EVOH, PVOH or PA, nor are they all equally strength-increasing like PA or PET. But all of them exhibit significantly improved properties in each of the individual properties, and even more so when they are combined in a composite film, especially after biaxial stretching, than any polyolefin-based raw material.

Due to the different optimal characteristics of the raw materials with a density of more than 1.0 g/cm³ with regard to their thermal resistance, printability as well as oxygen barrier and the resulting ideally or division to at least two separate layers, this division results in a further, very positive effect, namely a partly significant increase in the strength and stiffness of the film.

This effect becomes more pronounced the further apart the two layers containing a raw material with a density of more than 1.0 g/cm³ are arranged from each other in the overall composite of the layers.

It is therefore possible to select a layer structure which, on the one hand, comprises at least two independent layers with a density of more than 1.0 g/cm³, wherein one of these layers forms the outermost layer and the other an intermediate layer. On the other hand, the composite film should contain a heat-sealable layer which forms the innermost layer and consists of a material, such as a polyolefin in some embodiments, with a density of less than 0.95 g/cm³ and a melting temperature of less than 120° C.

Although such a layer structure makes it possible to achieve many desired properties (in particular sufficient oxygen and/or water vapor barrier, sealability, thermal resistance, printability and mechanical strength) in an outstanding manner, especially after biaxial stretching, the setting of a desired low shrinkage, in particular after biaxial stretching, is not yet solved.

This cannot be solved on the raw material side alone, at least not if the film produced has been subjected to biaxial stretching. This requires a suitable manufacturing process and/or a suitable treatment that fulfills this task.

Particularly after stretching, especially after biaxial stretching, polymers or films made from polymers comprise a sometimes considerable shrinkage. This shrinkage varies depending on the polymer and is dependent on whether and how much heat or temperature is applied to the film.

In other words, the higher the temperature and the longer the exposure time, the higher the shrinkage of the film.

From the state of the art, processes or treatments are known which are used for monoaxially, but also especially for biaxially oriented films, in order to reduce the shrinkage from the oriented films.

For monoaxially oriented films in particular, but also for biaxially oriented films, post-treatments are known, i.e. disposed after the stretching process, in which the films are passed over tempered rolls (so-called tempering rolls) with as high a wrap as possible. This introduces heat or temperature into the film, i.e. thermally fixes it, and thus reduces the remaining shrinkage.

In the stretching of flat films, the so-called tenter frame process, post-treatments (tempering), also known as thermo fixings or heat-setting (thermally fixing), are also known, wherein the film is passed horizontally through a downstream heating oven after stretching and is treated with hot air, thereby reducing the shrinkage.

In some embodiments of the method according to the present disclosure, the following stretching conditions are used in combination:

Stretching temperature in the range of 70 to 130° C.;
Stretch factor in the machine direction or longitudinal direction (MD): at least 2.0;
stretch factor in the transversal direction (TD): at least 2.0; and
sum of the stretch factor in the machine direction (MD) and the stretch factor in the transversal direction (TD): at least 5.0.

Furthermore, thermal post-treatments following stretching are also known from the so-called triple-bubble or multibubble process for tubular films. In this process, the films are passed through an oven in tubular form and treated with temperature, in most cases, as in the tenter frame process, by hot air. Alternatively, the film is treated with infrared or hot water vapor in the triple-bubble process to reduce the shrinkage caused by stretching.

Various technologies are known to reduce shrinkage after biaxial stretching by applying temperature. However, in addition to the level of temperature applied, the time or duration of the temperature impact is also a key factor here.

However, treating the film exclusively with heat/temperature in order not only to reduce the shrinkage in the films, but even to eliminate it completely, is only effective and sufficient for a few types of films.

For example, films produced in the tenter frame process, such as BoPET, BoPA or BoPP (Bo=biaxially oriented), are stabilized by a very high heat treatment (thermo fixing) so that they contain very little to no shrinkage.

The situation is similar for certain types of film that have been biaxially oriented in the double-bubble process and then thermally fixed by tempering rollers or a horizontal hot-air oven. In this case, too, BoPP or BoPA films in particular are often treated or fixed exclusively by temperature, and then show no or very little shrinkage.

This is mainly due to the fact that these film types are films, pure as regards the polymer types, independent of the stretching process, in which only one type of raw material is used, BoPET (exclusively PET), BoPA (exclusively PA), BoPP (exclusively PP).

In this case, a high thermo fixing temperature corresponding to the raw material, up to just below the softening point or melting point, can be selected for stabilization, and thus, shrinkage can be greatly reduced or even eliminated by the temperature treatment alone.

Up to now, however, this has been considered impossible for film types consisting of various raw materials, i.e. different types of raw materials, especially for raw materials with widely differing softening or melting temperatures.

In practice, for example, no coextruded or biaxially oriented films are known that contain a combination of various raw materials with widely differing softening or melting temperatures and, in addition, comprise no or only very slight shrinkage despite stretching.

Exceptions to this are isolated multilayer films produced by the tenter frame process or double-bubble process. This involves the following layer structure (from the inside to the outside; HV=adhesion promotor):

PP-HV-EVOH-HV-PP

Since HomoPP (homopolymer PP; melting temperature: 155 to 165° C.) is used almost exclusively in combination with EVOH and EVOH grades with a high ethylene content, which comprise a lower melting temperature than those with a low ethylene content (melting temperature: 170 to 180° C.), these composites can indeed be stabilized at similar temperatures almost exclusively by heat treatment, and the shrinkage can be reduced or eliminated.

However, these multilayer films based on PP, the majority of which consist of PP, do not exhibit the desired thermal resistance and certainly not the required printability.

Since even the most heat-resistant HomoPP grades melt at temperatures below 170° C. and PP is also one of the most non-polar raw materials, which is completely unsuitable for printing without further post-treatment, PP is not an ideal raw material to be useed in the outermost layer.

In addition, as is well known in the market, these PP-based multilayer films comprise only very poor or moderate sealability, i.e. a relatively high sealing temperature, due to the PP types used and the fundamentally poorer sealing properties compared to raw materials such as PE. Therefore, these films are conventionally laminated afterwards with PE-based films.

Consequently, a multilayer, coextruded and subsequently biaxially oriented film, which comprises a sealant layer with a low melting temperature, which has not been subsequently laminated, which furthermore contains a heat-resistant and printable (polar) outermost layer as well as an oxygen barrier layer located in the intermediate layers, and which comprises no or minimal shrinkage, is currently not considered to be producible.

This is due to the fact that such multilayer composites cannot be manufactured stably, or at all, at the temperature required to eliminate or reduce shrinkage below 5%, or better still below 3%, without further process measures.

Even before the temperature required to eliminate shrinkage is reached, individual layers in the multilayer composite soften or even melt, inevitably interrupting or at least massively impairing the film production process.

When or at what temperature process impairments or even interruptions occur depends on whether and how many layer portions of the entire film composite consist of non-polyolefin-based materials, i.e. temperature-resistant materials, with a density>1.00 g/cm$^3$ and a melting temperature greater than 160° C., or greater than 170° C.

If the mass fraction of the materials with a density>1.00 g/cm$^3$ is more than 40% based on the total mass of the film's layer structure, the composite film also permits treatment (thermofixation) at temperatures of 80 to 100° C., and at a mass fraction of 50% and more even beyond that.

But even with a high mass fraction of materials with a density>1.00 g/cm$^3$ of 40% and more, as long as the film composite contains a sealant layer of polyolefin-based raw materials with a density>0.95 g/cm$^3$, process impairments or interruptions always occur before a residual shrinkage of less than 5% is reached, respectively in MD and TD, since the temperatures required for thermo fixing the films must be at least between 120 and 150° C., and in this case even materials with a density>1.00 g/cm$^3$ and with melting temperatures greater than 160° C., or greater than 170° C., are no longer sufficient to keep the manufacturing process stable.

In order not to impair the film manufacturing process, only temperatures that do not completely eliminate shrinkage or shrink can be selected for thermal post-treatment.

In order to nevertheless reduce the shrinkage to a minimum or even eliminate it completely, a further process step is required in accordance with the present disclosure. In addition to the treatment of biaxially oriented films with temperature to eliminate shrinkage, a further process step, namely relaxation, is common, especially in the triple-bubble or multibubble process. In this process, the film is allowed to shrink back again in a controlled manner after stretching; this is known as relaxation and takes place with the introduction of temperature or heat.

Relaxation can take place in both directions, i.e. in the production direction or machine direction (MD) as well as in the transversal direction to production (TD).

Relaxation can take place equally in both directions (MD and TD) or in a different way in one or the other direction.

Furthermore, relaxation is also possible in only one direction, i.e. only in MD or TD. The choice of the relaxation direction can always be made independently. In the context of the present disclosure, the quantitative extend of the relaxation is expressed by the so-called relaxation factor, as defined in more detail below.

By "relaxation" is meant the controlled or controlled shrinkback of the film in MD and/or TD. Controlled shrinkback in MD is achieved by different take-off speeds, i.e. the film take-off downstream in the relaxation process runs or pulls at a lower speed than the film take-off upstream in the process. In TD, controlled shrinkback is achieved by reducing the film width between the two film take-offs. An example of a relaxation process of extruded and oriented single or multilayer films is known to the skilled person from Savic, Z., Savic. I, "Sausage Casings", VICTUS Lebensmittelindustriebedarf Vertriebsgesellschaft m. b. H., Vienna, 1st edition, 2002, chapter 7, subchapter 4.2, pages 267 to 270, in particular FIGS. 7-13a and 7-13b.

However, a relaxation of the film alone does not sufficiently reduce shrinkage, and in no case can shrinkage even be completely eliminated.

This is due to the fact that the films (shrink films/lidding films) are conventionally treated or fixed only at temperatures of max. up to 60 to 80° C. during relaxation, since these relatively low temperatures are already sufficient to achieve controlled shrinkback of the films and to reduce the remaining shrinkage to values around 10 to 20%, respectively in MD and TD, but at best to >5 to 10% in one of the two directions.

Lower shrinkage values have not been achievable so far, since neither the relaxation achievable at these conditions (temperatures) nor the applied temperature are sufficient to reduce the shrinkage to below 5%, respectively in MD and TD.

The amount of relaxation that can be realized depends on the level of temperature at which the film is treated or fixed.

Thus, the highest possible relaxation, which has a further positive effect on the remaining residual shrinkage, i.e. further reduces the residual shrinkage, can only be achieved with correspondingly high temperatures in the film treatment (thermo fixing).

In this case, however, the same problem arises again as described previously, namely that when treating films, in particular films containing combinations of raw materials with widely differing melting temperatures, with the temperatures required to eliminate the shrinkage, softening or even melting of individual layers occurs and thus inevitably interrupts, or at least massively impairs, the manufacturing process of the film.

When the film is treated with a combination of temperature and relaxation, the temperature range at which the manufacturing process is impaired or interrupted again depends on the mass fraction of the materials (density>1.00 g/cm$^3$) in the layer structure of the film.

Surprisingly, however, the proportion of materials (density>1.00 g/cm$^3$) contained in the film can be significantly lower with appropriate relaxation than with exclusive heat treatment without relaxation.

Thus, with appropriate relaxation, treatment at significantly higher temperatures, in any case above 60° C., above 70° C., above 80° C., up to temperatures of 180° C., up to 150° C., or up to 120° C., can be applied, with simultaneous reduction of the materials (thermoplastic resin with a density>1.00 g/cm$^3$) to a mass fraction in any case below 40%, below 30%, below 20%, or down to a mass fraction of even less than 10%, based on the total mass of the layer structure of the film. In this case, the mass fraction of the thermoplastic resin with a density>1.00 g/cm$^3$ based on the total mass of the layer structure of the film is at least 1%, or at least 5%.

In some embodiments of the method according to the present disclosure, the temperature of the composite film during relaxation can be set to one of the following ranges: 60 to 180° C., 60 to 150° C., 60 to 120° C., or 80 to 100° C.

In some embodiments of the method according to the present disclosure, the dwell time (dwell duration) during relaxation, during relaxation under temperature, is 2 to 30 seconds, 2 to 20 seconds, 5 to 30 seconds, 5 to 20 seconds, 2 to 10 seconds or 5 to 10 seconds.

In some embodiments, a low shrinkage is achieved by setting the sum of the relaxation factor in the machine direction (MD) and the relaxation factor in the transversal direction (TD) to at least 0.05 (=5%), at least 0.1 (=10%), at least 0.2 (=20%), or at least 0.4 (=40%). In this case, the relaxation factor in the machine direction and the relaxation factor in the transversal direction are each at least greater than 0.00.

Consequently, the relaxation factors, in addition to the introduced fixing temperature (temperature of the composite film during relaxation), are decisive factors for reducing or eliminating again the shrinkage introduced during stretching of the film.

In the context of the present disclosure, it has thus proven to be effective in achieving low shrinkage to reduce or relax the stretching or elongation of the film introduced during stretching in a controlled manner.

If the sum of the process steps including stretching and subsequent relaxation is considered, there is a residual stretch or elongation in the film after both process steps. A residual stretch factor can be determined, which is defined in detail below and which is based on the ratio of a length of a section of the composite film after stretching and after relaxation to a length of the same section before stretching and before relaxation.

Since the residual stretch factor results equally from both processes (stretching and relaxation), it can ideally also be influenced or changed equally by both processes.

A closer look at this dependence reveals that even a reduction of the stretching factor under otherwise identical conditions results in an effect similar to a later relaxation of the film, i.e., with lower stretching a very low shrinkage can be achieved even with lower relaxation, and with high stretching a high relaxation is again required to keep the shrinkage low. But surprisingly, basically the influence of the relaxation factor is much higher than that of the stretch factor.

Nevertheless, it is not the relaxation alone, but rather the sum or factor of both process steps that is decisive.

Thus, the residual stretch factor and, of course, the temperature introduced in the relaxation determine whether and how much shrinkage remains in the film.

Since not only the relaxation process and the temperature introduced in it, but also the stretching process have a significant influence on the residual shrinkage remaining, and the stretching process is also subject to temperature treatment, the influence from this must also be considered.

In fact, an influence can also be seen here, i.e. at low stretching temperatures, without a simultaneous change in other process parameters, there is a higher residual shrinkage than compared with higher stretching temperatures.

Compared to relaxation, however, the stretching process is much more sensitive, i.e. the temperatures required to obtain a stable process at all are often within a temperature window of only +/−2 to +/−3° C. Therefore, the temperature range to be varied is smaller or limited in this case.

In addition, the influence of the temperature of the composite film during stretching is rather small according to the knowledge of the inventors.

The temperature during stretching of the composite film is thus an influencing factor, but not of the same decisive importance as the temperature in the relaxation or else the stretching factor as well as the relaxation factor or the residual stretch factor.

A closer look at the process steps and their influence reveals another significant factor, namely the time or duration for which the film is exposed to the individual process steps and the prevailing conditions.

However, it turns out that the influence of the time factor in the stretching process is rather negligible compared to the influence of the temperature and the stretch factor.

In contrast, it turns out that in the relaxation process, the time (duration) of the relaxation can be of at least equal importance as the relaxation factor and the prevailing temperature.

It turns out that the interaction of time (duration) and relaxation factor is less significant than the time (duration) in connection with the temperature, i.e. more precisely, the duration to which the film is exposed to the temperature during relaxation.

The longer the duration of the temperature treatment, the greater the influence and thus the reduction in residual shrinkage.

However, it also becomes apparent that this cannot be increased indefinitely, but rather that after a certain duration under the influence of temperature, no further increase, i.e. shrinkage reduction, can be realized and a kind of saturation sets in.

Much more decisive, however, is the duration for which the film is at least/at least under the influence of temperature, so here a duration or dwell time under temperature of at least 2 seconds is required in order to recognize a desired influence.

Thus, the method according to the present disclosure may be limited in that the composite film has a temperature in one of the aforementioned temperature ranges for a predetermined period of time during relaxation (a so-called "dwell time under temperature"). Thus, in some embodiments, a duration of relaxation or a dwell time during relaxation under temperature may be at least 2 seconds, in particular more than 5 seconds. Thereby, the duration of the relaxation or the dwell time during the relaxation under temperature may be limited to at most 30 seconds, at most 20 seconds, or at most 10 seconds.

Just as the temperature or the relaxation alone cannot bring about a correspondingly low shrinkage, the dwell time under temperature alone cannot do so. These influencing variables and the effect they achieve are interdependent and influence each other.

For example, the residual shrinkage of the film (shrinkage after stretching and relaxation) is low with high temperature treatment and simultaneous high relaxation despite short dwell time under temperature.

However, the remaining residual shrinkage of the film is also low when treated at high temperature and long dwell time under temperature despite low relaxation.

The remaining residual shrinkage of the film is also low with long dwell time under temperature and high relaxation despite moderate temperature treatment.

It is therefore only the combination of these influencing variables that makes it possible to achieve the desired low residual shrinkage of the film.

In order to achieve low shrinkage in the claimed layer structures, it is therefore not only the ideal layer structure with the raw materials contained therein in combination with the temperatures applied in the individual process steps, but also the process factors, in particular the stretch factor, the relaxation factor and the residual stretch factor, as well as the dwell time that are of decisive importance, but at least the duration of the thermal fixation (relaxation). By combining the features and parameters mentioned in this description or defined in the claims, the goal has been achieved for the first time of manufacturing, and in particular stably manufacturing, a generic composite film by lamination or by coextrusion, coextrusion without lamination, which, in addition to improved processability and/or recyclability, also comprises other properties, such as thermal resistance, printability, oxygen barrier, and no shrinkage or a shrinkage of less than 5% or less than 3%, in the MD and TD, respectively.

In some embodiments, the thermoplastic resin included in the layer (c) or of which the layer (c) consists has a melting temperature of less than 120° C. The increased temperature difference to the melting temperature of the outermost layer causes that the composite film can be sealed earlier, i.e., already at a lower temperature. In addition, higher cycle rates can be achieved during further processing of the composite film.

In some embodiments, the thermoplastic resin contained in the layer (a) or of which the layer (a) consists has a melting temperature of more than 160° C. or more than 170° C. Due to the higher temperature of the outermost layer, it is possible to work at higher temperatures during further processing and thus, to achieve higher cycle rates during further processing of the composite film.

Furthermore, according to the present disclosure, the layer (a), i.e. the outermost layer, can have a predetermined polarity, which is represented in the form of the surface tension, given in the unit dyn/cm ($=10^{-3}$ N/m). In some embodiments, this value may be >40 dynes/cm (>40·$10^{-3}$ N/m), in particular >42 dynes/cm (>42·$10^{-3}$ N/m), to enable the best possible printability.

According to the present disclosure, it can further be provided in an some embodiments that the outermost layer (a) consists of or contains EVOH.

To date, no generic composite film is known from the state of the art in which EVOH has been used as a layer component in the outermost layer (a), or in which the layer (a) would consist of EVOH. Thus, the use of EVOH as a material with an oxygen barrier is known from the state of the art. However, a use for this purpose requires an inside position/arrangement of EVOH, since EVOH quickly loses its good oxygen barrier properties due to moisture penetration. Therefore, EVOH has only ever been used as a layer component or layer material sandwiched on both sides by protective layers, such as polyolefin or polyamide, some of which comprise a high water vapor barrier. However, the use of EVOH in generic composite films for a different purpose and in a different manner or in a different arrangement, for example as an outermost or sealant layer (innermost layer; surface to the good to be packaged), has not been known to date.

In contrast, according to the present disclosure, the possibility of deliberately using EVOH in the layer (a), i.e. in the outermost layer constituting an outward surface of the composite film, is provided. In this context, the outermost layer (a) may contain or consist of EVOH. However, when EVOH is provided in the outermost layer (a), it is not the property of EVOH as an oxygen barrier that plays a role. Rather, what matters according to the present disclosure is that the use of EVOH in the outermost layer substantially increases the recyclability of the film compared to composite films that comprise outermost layers with PA or PET. This is because the EVOH comprises a lower melting temperature compared to the PA and PET materials previously provided in the outermost layer, so that the difference in the melting temperatures of the outermost layer and the sealant layer (innermost layer) is reduced. Thereby, the overall melting temperature required for recycling can be reduced, which improves the recyclability of the composite film.

In addition, the inventors have found that the EVOH in the outermost layer can further improve the mechanical properties, such as stiffness and printability, of the film similar to PET or PA compared to polyolefins, such as PE or PP. For example, the higher melting temperature of the EVOH compared to these polyolefins and, associated with this, the greater temperature resistance to the innermost layer (sealant layer) leads to an overall improvement in the further processability of the composite film (cycle numbers).

The method according to the present disclosure may further be configured as a method for manufacturing a multilayered composite film, wherein the method includes at least the following step:

a step of co-extruding and/or laminating at least four layers (a), (b), (d) and (c), of which
the layer (a) forms an outward surface of the composite film
the layer® forms a surface of the composite film facing or coming in contact with a good to be packaged; and
the layer (b) is disposed between the layer (a) and the layer (c);
the layer (d) is disposed between the layer (a) and the layer (c), such as between the layer (a) and the layer (b);
wherein the layer (b) consists of a single layer or a plurality of layers (b1, b2, . . . ), such as two, three or four layers;
wherein the layer (d) consists of a single layer or a plurality of layers (d1, d2, . . . ), such as two, three or four layers;
a step of stretching the co-extruded or laminated composite film; and
a step of relaxing the oriented or stretched composite film;
wherein the stretching is bi-axial;
wherein a stretch factor in the machine direction or longitudinal direction (MD) is at least 2.0;
wherein a stretch factor in the transversal direction (TD) is at least 2.0;

wherein the sum of the stretch factor in the machine direction (MD) and of the stretch factor in the transversal direction (TD) is at least 5.0;

wherein the composite film has a temperature of 70 to 130° C. during stretching;

wherein a relaxation factor in the machine direction (MD) is more than 0.00;

wherein a relaxation factor in the transversal direction (TD) is more than 0.00;

wherein the sum of the relaxation factor in the machine direction (MD) and the relaxation factor in the transversal direction (TD) is at least 0.05 (=5%), at least 0.1 (=10%), at least 0.2 (=20%), or at least 0.4 (=40%);

wherein the composite film has a temperature of 60 to 180° C., 60 to 150° C., 60 to 120° C., or 80 to 100° C., during relaxation;

wherein a dwell time during relaxation, such as during relaxation under temperature, is at least 2 seconds, or more than 5 seconds, or the duration of relaxation is at least 2 seconds, or more than 5 seconds;

wherein a dwell time during relaxation, such as during relaxation under temperature, is at most 30 seconds, at most 20 seconds, or at most 10 seconds, or the duration of relaxation is at most 30 seconds, at most 20 seconds, or at most 10 seconds;

wherein a residual stretch factor in the machine direction (MD) is at most 5.0;

wherein a residual stretch factor in the transversal direction (TD) is at most 5.0;

wherein the layer (a) comprises or consists of ethylene-vinyl alcohol copolymer (EVOH) having a density of at least 1.12 g/cm$^3$;

wherein the layer (d) or the plurality of layers (d1, d2, . . . ) each comprises or consists of a thermoplastic resin, such as a polyolefin, having a density of less than 1.00 g/cm$^3$ or less than 0.98 g/cm$^3$;

wherein the layer (b) or the plurality of layers (b1, b2, . . . ) each comprises or consists of a thermoplastic resin having a density greater than 1.00 g/cm$^3$; and wherein the layer (c) comprises or consists of a thermoplastic resin having a density of less than 0.95 g/cm$^3$.

Further, embodiments of the method according to the present disclosure are the subject-matter of the dependent claims.

The above-described method according to the present disclosure and its embodiments may further be characterized in that
the layer (b) does not contain EVOH; or
none of the layers (b1, b2, . . . ) contains EVOH; or
the layer (b) comprises or consists of EVOH; or
at least one of the layers (b1, b2, . . . ) comprises or consists of EVOH; or
none of the layers of the composite film other than layer (a) contains EVOH.

The method according to the present disclosure described above and its embodiments may further be characterized in that
the EVOH of the layer (a) has a melting temperature of at least 160° C. or at least 170° C.; and/or
the thermoplastic resin of layer (c) is a polyolefin having a sealing temperature lower than the sealing temperature of the thermoplastic resin of layer (a); and/or
the thermoplastic resin of layer (c) is a polyolefin having a melting temperature lower than 120° C.; and/or
the thermoplastic resin of layer (b) has an oxygen permeability of less than 100 cm$^3$/m$^2$·d·bar or the thermoplastic resins of layers (b1, b2, . . . ) each or in total have an oxygen permeability of less than 100 cm$^3$/m$^2$·d·bar; and/or the layer (b) comprises an oxygen permeability of less than 100 cm$^3$/m$^2$·d·bar or the layers (b1, b2, . . . ) each or in total comprise an oxygen permeability of less than 100 cm$^3$/m$^2$·d·bar; and/or the stretching is carried out simultaneously or successively in several stages; and/or the composite film after stretching and relaxation comprises a shrinkage of less than 0.05 (=5%) or less than 0.03 (=3%), in the machine direction (MD); and/or the composite film after stretching and relaxation comprises a shrinkage of less than 0.05 (=5%) or less than 0.03 (=3%), in the transversal direction (TD); and/or the composite film after stretching and relaxation comprises a sum of the shrinkage in the machine direction (MD) and the shrinkage in the transversal direction (TD) (=total shrinkage) of less than 0.05 (=5%).

By the link "and/or" it is expressed that the method according to the present disclosure can be characterized by a single, by all or by any selection or combination of the above-mentioned features. This definition also applies analogously to the use of the link "and/or" in the following parts of the description and in the claims.

The above-described method according to the present disclosure and its embodiments may further be characterized in that
the thickness of layer (a) does not exceed 20% or 10%, of the thickness of the entire composite film; and/or
the thickness of layer (b) or the total thickness of the layers (b1, b2, . . . ) does not exceed 20% or 10%, of the thickness of the entire composite film; and/or
the mass fraction of layer (a) based on the total mass of the composite film does not exceed 10%; and/or
the mass fraction of layer (b) or the sum of the mass fractions of the layers (b1, b2, . . . ) based on the total mass of the composite film does not exceed 10%; and/or
the sum of the mass fractions of the layer (a) and the layer (b) or of the layer (a) and the layers (b1, b2, . . . ) does not exceed 10% based on the total mass of the composite film.

The above-described method according to the present disclosure and its embodiments may further be characterized in that
the layer (a) does not contain at least one of the following types of polymer: a polyester, such as a polyethylene terephthalate (PET) or a polylactic acid or a polylactide (PLA), or a polyamide (PA); and/or
the thermoplastic resin of the layer (c) comprises or consists of a polyolefin (PO), such as a polyethylene (PE) and/or a polypropylene (PP), an ethylene-vinyl acetate copolymer (EVA), an ionomer (IO), an ethylene-methyl methacrylate copolymer (EMMA), an ethylene-methacrylic acid copolymer (EMA), or any mixture thereof.

The above-described method according to the present disclosure and its embodiments may further be characterized in that the mass fraction of the layer components with a density>1.0 g/cm$^3$, such as the EVOH of layer (a) with a density>1.12 g/cm$^3$, is 1 to <40%, 1 to <30%, 1 to <20%, or 5 to <20%, based on the total mass of the composite film.

The object according to the present disclosure is further solved by a multilayered, coextruded and/or laminated, biaxially oriented and relaxed composite film, which is manufactured according to the method according to the present disclosure as described above and defined in the claims. Thereby, the composite film according to the present disclosure comprises at least two layers (a) and (c), of which
the layer (a) forms an outward surface of the composite film; and
the layer (c) forms a surface of the composite film facing or coming in contact with a good to be packaged; and
wherein the layer (a) comprises or consists of ethylene-vinyl alcohol copolymer (EVOH); and
wherein the layer (c) comprises or consists of a thermoplastic resin.

The aspects discussed above in connection with the method according to the present disclosure apply analogously to the composite film according to the present disclosure and its variations.

According to the present disclosure, the object is further solved by a multilayered, coextruded and/or laminated, biaxially oriented and relaxed composite film, which has been or is manufactured by the method according to the present disclosure,
comprising at least three layers (a), (b) and (c), of which
the layer (a) forms an outward surface of the composite film;
the layer (c) forms a surface of the composite film facing or coming in contact with a good to be packaged; and
the layer (b) is disposed between the layer (a) and the layer (c);
wherein the layer (b) consists of a single layer or a plurality of layers (b1, b2, b3, b4, . . . ), such as two, three or four layers;
wherein a residual stretch factor of the composite film in the machine direction (MD) is at most 5.0;
wherein a residual stretch factor of the composite film in the transversal direction (TD) is at most 5.0;
wherein the layer (a) comprises or consists of ethylene-vinyl alcohol copolymer (EVOH) having a density of at least 1.12 g/cm$^3$;
wherein the layer (b) or the plurality of layers (b1, b2, . . . ) each comprises or consists of a thermoplastic resin having a density greater than 1.00 g/cm$^3$; and
wherein the layer (c) comprises or consists of a thermoplastic resin having a density of less than 0.95 g/cm$^3$.

According to the present disclosure, the object is further solved by a multilayered, coextruded and/or laminated, biaxially oriented and relaxed composite film, which has been or is manufactured by the method according to the present disclosure,
comprising at least four layers (a), (b), (d) and (c), of which
the layer (a) forms an outward surface of the composite film;
the layer (c) forms a surface of the composite film facing or coming in contact with a good to be packaged; and
the layer (b) is disposed between the layer (a) and the layer (c);
the layer (d) is disposed between the layer (a) and the layer (c), such as between the layer (a) and the layer (b);
wherein the layer (b) consists of a single layer or a plurality of layers (b1, b2, . . . ), such as two, three or four layers;
wherein the layer (d) consists of a single layer or a plurality of layers (d1, d2, . . . ), such as two, three or four layers;
wherein a residual stretch factor of the composite film in the machine direction (MD) is at most 5.0;
wherein a residual stretch factor of the composite film in the transversal direction (TD) is at most 5.0;
wherein the layer (a) comprises or consists of ethylene-vinyl alcohol copolymer (EVOH) having a density of at least 1.12 g/cm$^3$;
wherein the layer (d) or the plurality of layers (d1, d2, . . . ) each comprises or consists of a thermoplastic resin, such as a polyolefin, having a density of less than 1.00 g/cm$^3$ or less than 0.98 g/cm$^3$;
wherein the layer (b) or the plurality of layers (b1, b2, . . . ) each comprises or consists of a thermoplastic resin having a density greater than 1.00 g/cm$^3$; and
wherein the layer (c) comprises or consists of a thermoplastic resin having a density of less than 0.95 g/cm$^3$.

Aspects of the composite film according to the present disclosure are the subject-matter of the dependent claims.

Thus, the composite film according to the present disclosure may be characterized in that,
the thermoplastic resin of the layer (b) has an oxygen permeability of less than 100 cm$^3$/m$^2$·d·bar or the thermoplastic resins of the layers (b1, b2, . . . ) each or in total have an oxygen permeability of less than 100 cm$^3$/m$^2$·d·bar; and/or
the layer (b) has an oxygen permeability of less than 100 cm$^3$/m$^2$·d·bar or the layers (b1, b2, . . . ) each or in total have an oxygen permeability of less than 100 cm$^3$/m$^2$·d·bar; and/or
the thickness of layer (b) or the total thickness of the layers (b1, b2, . . . ) does not exceed 20% or 10%, of the thickness of the entire composite film; and/or
the mass fraction of layer (b) or the sum of the mass fractions of the layers (b1, b2, . . . ) based on the total mass of the composite film does not exceed 10%; and/or
the sum of the mass fractions of the layer (a) and the layer (b) or of the layer (a) and the layers (b1, b2, . . . ) based on the total mass of the composite film does not exceed 10%.

Furthermore, the composite film according to the present disclosure can be characterized in that
the EVOH of the layer (a) has a melting temperature of at least 160° C. or at least 170° C.; and/or
the thermoplastic resin of layer (c) is a polyolefin with a sealing temperature lower than the sealing temperature of the EVOH of layer (a); and/or
the thermoplastic resin of layer (c) is a polyolefin having a melting temperature of lower than 120° C.

Furthermore, the composite film according to the present disclosure can be characterized in that
the composite film after stretching and relaxation has a sum of the shrinkage in the machine direction (MD) and the shrinkage in the transversal direction (TD) (=total shrinkage) of less than 0.05 (=5%); and/or
the thickness of the layer (a) does not exceed 20% or 10%, of the thickness of the entire composite film; and/or
the layer (a) does not contain at least one of the following types of polymer: a polyester, such as a polyethylene terephthalate (PET) or a polylactic acid or a polylactide (PLA), or a polyamide (PA); and/or
the thermoplastic resin of layer (c) comprises or consists of a polyolefin (PO), such as a polyethylene (PE) and/or a polypropylene (PP), an ethylene-vinyl acetate copolymer (EVA), an ionomer (IO), an ethylene-methyl methacrylate copolymer (EMMA), an ethylene-methacrylic acid copolymer (EMA), or any mixture thereof; and/or the mass fraction of the layer components with a density>1.0 g/cm$^3$, such as the EVOH of layer (a) with a density≥1.12 g/cm$^3$, is 1 to <40%, 1 to <30%, 1 to <20%, or 5 to <20%, based on the total mass of the composite film.

According to the present disclosure, the object is further fulfilled by the use of the composite film according to the present disclosure, as defined in the claims or described above, or of a casing made therefrom for packaging a good, such as for packaging a food product, a luxury food product or a liquid or solid, in particular powdery, good.

In some embodiments, the use according to the present disclosure can be characterized in that the mass fraction of the layer components with a density>1.0 g/cm$^3$, such as the EVOH of layer (a) with a density≥1.12 g/cm$^3$, is 1 to <40%, 1 to <30%, 1 to <20%, or 5 to <20%, based on the total mass of the composite film.

The aspects discussed above in connection with the method according to the present disclosure apply analogously to the use of the composite film according to the present disclosure and its modifications.

Supplementary Disclosure

The method for manufacturing a multilayered composite film according to the present disclosure described herein may be characterized in that it does not comprise a step of laminating, i.e., bonding, layers or layer composites.

Accordingly, the multilayered composite film described herein according to the present disclosure may be a non-laminated composite film.

Length definitions (each based on machine direction or transversal direction):

L0:=length of a predetermined section of the composite film before stretching;

L1:=length of the same section of composite film after stretching and before relaxation;

L2:=length of the same section of composite film after stretching and before relaxation;

L3:=length of the same section of composite film after stretching and after relaxation;

Stretch factor definition: stretch factor V=length L1 of a predetermined section of the composite film after stretching and before relaxation divided by length L0 of the same section of the composite film before stretching; (V=L1/L0).

Definition of relaxation factor: relaxation factor RL=amount of difference of (the length L3 of a predetermined section of the composite film after stretching and after relaxation and the length L2 of the same section of the composite film after stretching and before relaxation) divided by the length L2 of the same section of the composite film after stretching and before relaxation; (RL=|(L3−L2)|/L2)

Definition of residual stretch factor; residual stretch factor RV=length L3 of a predetermined section of the composite film after stretching and after relaxation divided by length L0 of the same section of the composite film before stretching and before relaxation; (RV=L3/L0)).

In some embodiments, the composite film according to the present disclosure is a multilayered composite film with barrier function or a multilayer barrier film, wherein the barrier property refers to reduced oxygen permeability or reduced water vapor permeability or both.

Shrinkage (or heat shrinkage): measured in water at 90° C., such as within 1 second after immersion, but at least within 10 seconds after immersion.

According to the present disclosure, to determine the shrinkage (or hot shrinkage), the sample is immersed in water at 90° C. for a predetermined period of time, in particular the aforementioned period of time, and immediately cooled to room temperature with water after removal. The length of a pre-marked section after this treatment is measured, and reference is made to measured length of the same section of the sample before treatment. The resulting length ratio ("shrunk" to "unshrunk"), given as a percentage, defines the shrinkage or shrink. Depending on the direction of the length measurement, the shrinkage is obtained in the longitudinal (MD) and transverse (TD) directions. The total shrinkage is calculated by adding the shrinkage in the longitudinal and transversal directions. Multiple determinations, such as triplicate or quintuplicate determinations, of the length measurements, and the formation of the corresponding average values therefrom, increase the accuracy of the determination. According to the present disclosure, the shrinkage and the total shrinkage can be determined, in particular according to ASTM 2732.

In the present disclosure, oxygen permeability is measured at 23° C. and 75% relative humidity (ASTMD 1434).

The method according to the present disclosure and the composite film according to the present disclosure can be carried out or manufactured using the so-called double-bubble and in particular the triple-bubble method, for which the applicant provides suitable equipment, which is known to the skilled person. In this process, the multilayered composite film can be coextruded from the respective resin melts, for example, by a nozzle blow head of the applicant set up for manufacturing composite films with three or more layers, in some embodiments, with thermal separation of the individual layers, cooled with a water cooling system of the applicant, reheated, biaxially oriented (in the machine direction (MD) and in the transversal direction (TD)) by an enclosed compressed air bubble and finally relaxed (=heat-set or thermofixed) in a further step in a defined temperature regime. The composite film according to the present disclosure can be a composite film which comprises a barrier against gas diffusion, in particular oxygen diffusion, and/or against water vapor diffusion. Such a manufacturing process is also known to the skilled person from the textbook by Savic, Z., Savic, I., "Sausage Casings", 1st edition, 2002, VICTUS Lebensmittelindustriebedarf Vertriebsgesellshaft m.b.H., Vienna, Austria, chapter 7, esp. subchapter 4.2, pages 267 to 270.

Another way of manufacturing the film according to the present disclosure is by stretching a co-extruded flat film according to the tenter-frame method known to those skilled in the art.

The composite film of the present disclosure can be obtained on an apparatus or plant of the same applicant for manufacturing tubular food films for food packaging, such as, for example, shrink films or shrink bags, by the jet-blow process, if the device for rapidly cooling thin thermoplastic tubes after their extrusion disclosed in patent specification DE 199 16 428 B4 of the same applicant is additionally used. For this purpose, a corresponding further development according to patent specification DE 100 48 178 B4 can also be taken into account.

In this process, the tubular film produced from the plastic melt in the nozzle blow head is subjected to intensive cooling, during which the amorphous structure of the thermoplastics from the plastic melt is retained. The tubular film vertically extruded from the plastic melt in the nozzle blow head initially moves without wall contact into the cooling device for cooling, as described in detail in the DE 199 16

428 B4 and DE 100 48 178 B4 publications. In order to avoid repetition, full reference is made to the contents of DE 199 16 428 B4 and DE 100 48 178 B4 with regard to details of the process, structure and operation of this cooling system, which is also referred to as a calibration device.

The tubular film then passes through supports in the cooling system, against which the film is supported as a result of a differential pressure between the interior of the tubular film and the coolant, wherein a liquid film is maintained between the film and the supports, so that sticking of the tubular film is precluded. The diameter of the supports thereby influences the diameter of the tubular film, which is why this cooling system of the same applicant is also referred to as a calibration system.

According to the present disclosure, polyamide (PA) can be a substance selected from a group consisting of PA of ε-caprolactam or poly(ε-caprolactam) (PA6), PA of hexamethylenediamine and adipic acid or polyhexamethyleneadipinamide (PA6.6), PA of ε-caprolactam and hexamethylenediamine/adipic acid (PA6.66), PA of hexamethylenediamine and dodecanedioic acid or polyhexamethylenedodecanamide (PA6.12), PA of 11-aminoundecanoic acid or polyundecanamide (PA11), PA of 12-laurinlactam or poly(ω-laurinlactam) (PA12), or a mixture of these PAs or a mixture of these PAs with amorphous PA or with other polymers. The general notation PAx.y is synonymous with PAx/y or PAxy.

For the purpose of this application, polyolefin (PO) may be a substance selected from a group consisting of PP, PE, LDPE, LLDPE, polyolefin plastomer (POP), ethylene-vinyl acetate copolymers (EVA), ethylene-methyl methacrylate copolymers (EMMA), ethylene-methacrylic acid copolymers (EMA), ethylene-acrylic acid copolymers (EAA), copolymers of cycloolefins/cycloalkenes and 1-alkenes or cycloolefin copolymers (COC), ionomers (IO) or a mixture or blend thereof. Furthermore, in the context of the present disclosure, PO also includes a blend of the above PO with ionomers and/or with adhesion promoters.

In the context of the present disclosure, polyester may be used as a layer component for layer (a). Polyesters are polymers with ester functions in their main chain and may be, in particular, aliphatic or aromatic polyesters. Polyesters can be obtained by polycondensation of corresponding dicarboxylic acids with diols. Any dicarboxylic acid suitable for forming a polyester can be used to synthesize the polyester, in particular terephthalic acid and isophthalic acid, as well as dimers of unsaturated aliphatic acids. As the further component for the synthesis of the polyester, diols can be used, such as: Polyalkylene glycols, such as ethylene glycol, propylene glycol, tetramethylene glycol, neopentyl glycol, hexamethylene glycol, diethylene glycol, polyethylene glycol and polytetramethylene oxide glycol; 1,4-cyclohexanedimethanol, and 2-alkyl-1,3-propanediol.

In some embodiments PET, which stands for the polyester polyethylene terephthalate (PET), is used. PET can be obtained by polycondensation of terephthalic acid (1,4-benzenedicarboxylic acid) and ethylene glycol (1,2-dihydroxyethane).

In some embodiments, another polyester are polylactides or polylactic acids (PLA), which may be included as layer components in the layers for which a polyester is provided as a layer component. These polymers are biocompatible/biodegradable and comprise high melting temperatures or high melting points and good tensile strength, in addition to low moisture absorption.

In the context of the present disclosure, EVOH stands for EVOH as well as for a blend of EVOH with other polymers, ionomers, EMA or EMMA. In particular, EVOH also includes a blend of EVOH and PA or of EVOH and ionomer.

Adhesion promotors (HV) may be provided as intermediate layers in the composite film according to the present disclosure and represent adhesive layers that provide good bonding adhesion between the individual layers. In this context, HV can be based on a base material, selected from a group, consisting of PE, PP, EVA, EMA, EMMA, EAA and an ionomer, or a mixture thereof. Particularly suitable adhesion promoters (HV) according to the present disclosure are EVA, EMA or EMMA, each with a purity of >99% or >99.9%.

According to a further embodiment, layers comprising HV as layer component may also comprise a mixture of PO and HV or a mixture of EVA, EMA, EMMA and/or EAA and HV or a mixture of ionomer and HV or a mixture of a plurality of HV.

For the purposes of the present disclosure, the melting point of a polymer is determined by dynamic differential calorimetry or differential thermal analysis in accordance with DIN 51007:2019-04 or DIN EN ISO 11357-1:2017-02. Alternatively, the ASTM D3418 method is also known from the state of the art.

For the purposes of the present disclosure, the softening point of a polymer is determined according to the method for determining the Vicat softening temperature (VST) according to DIN EN ISO 306:2014-03.

For the purposes of this present disclosure, printability is measured according to DIN 16500-2:2018-09.

For the purposes of the present disclosure, the designation of a material as a "layer component" means that a layer of the composite film according to the present disclosure comprises this material at least in part. In this context, the designation "layer component" within the meaning of the present disclosure may in particular include that the layer consists entirely or exclusively of this material.

For the purposes of the present disclosure, "middle" or "intermediate" layer means a layer of the composite film which is disposed between layer (a) and layer (c). According to the present disclosure, layer (a) is the layer which forms an outward surface of the composite film (outermost layer). According to the present disclosure, layer (c) is the layer which forms a surface of the composite film facing or coming into contact with goods to be packaged (innermost layer). By definition, layers (a) and (c) of the composite film according to the present disclosure cannot be a "middle" or "intermediate" layer.

In some embodiments, the composite film according to the present disclosure is sheet-like or tubular. In some embodiments, the composite film is a food film or food casing. In some embodiments, the composite film is suitable for use as a non-heatshrinkable packaging material.

Examples of coextruded and biaxially oriented multilayer films with barrier function according to the present disclosure with at least three layers (a), (b) and (c) 3-layer structures

| (a) | (b) | (c) |
|---|---|---|
| EVOH | PA | PO |

Examples of coextruded and biaxially oriented multilayer films with barrier function according to the present disclosure with at least four layers (a), (b), (d) and (c)

4-Layer Structures

| (a) | (d) | (b) | (c) |
|---|---|---|---|
| EVOH | PO | EVOH | PO |
| EVOH | PO | PVDC | PO |
| EVOH | PO | PA | PO |

5-Layer Structures

| (a) | (d1) | (b) | (d2) | (c) |
|---|---|---|---|---|
| EVOH | PO | EVOH | HV | PO |
| EVOH | PO | PVDC | HV | PO |
| EVOH | PO | PA | HV | PO |

7-Layer Structures

| (a) | (d1) | (d2) | (d3) | (b) | (d4) | (c) |
|---|---|---|---|---|---|---|
| EVOH | HV | PO | HV | EVOH | HV | PO |
| EVOH | HV | PO | HV | PVDC | HV | PO |
| EVOH | HV | PO | HV | PA | HV | PO |

9-Layer Structures

| (a) | (d1) | (d2) | (d3) | (b1) | (b2) | (b3) | (d4) | (c) |
|---|---|---|---|---|---|---|---|---|
| EVOH | HV | PO | HV | PA | EVOH | PA | HV | PO |

The invention claimed is:

1. A method for manufacturing a multilayered composite film, the method comprising the following steps:
   a step of co-extruding and/or laminating at least three layers (a), (b) and (c) of which:
   the layer (a) forms an outward surface of the composite film;
   the layer (c) forms a surface of the composite film facing or coming in contact with a good to be packaged; and
   the layer (b) is disposed between the layer (a) and the layer (c);
   the layer (b) includes a single layer or a plurality of layers (b);
   a step of stretching the co-extruded or laminated composite film; and
   a step of relaxing the stretched composite film;
   wherein the stretching is bi-axial;
   wherein a stretch factor in a machine direction (MD) is at least 2.0;
   wherein a stretch factor in a transversal direction (TD) is at least 2.0;
   wherein a sum of the stretch factor in the machine direction (MD) and the stretch factor in the transversal direction (TD) is at least 5.0;
   wherein the composite film has a temperature of 70 to 130° C. during stretching;
   wherein a relaxation factor in the machine direction (MD) is more than 0.00;
   wherein a relaxation factor in the transversal direction (TD) is more than 0.00;
   wherein a sum of the relaxation factor in the machine direction (MD) and the relaxation factor in the transversal direction (TD) is at least 0.05;
   wherein the composite film has a temperature of 60 to 180° C. during relaxation;
   wherein a dwell time during relaxation is at least 2 seconds;
   wherein the dwell time during relaxation is at most 30 seconds;
   wherein a residual stretch factor in the machine direction (MD) is at most 5.0;
   wherein a residual stretch factor in the transversal direction (TD) is at most 5.0;
   wherein the layer (a) comprises ethylene-vinyl alcohol copolymer (EVOH) having a density of at least 1.12 g/cm$^3$;
   wherein the layer (b) or the plurality of layers (b) comprises of a thermoplastic resin having a density greater than 1.00 g/cm$^3$; and
   wherein the layer (c) comprises a thermoplastic resin having a density of less than 0.95 g/cm$^3$.

2. A method for manufacturing a multilayered composite film, the method comprising the following steps:
   a step of co-extruding and/or laminating at least four layers (a), (b), (d) and (c) of which:
   the layer (a) forms an outward surface of the composite film;
   the layer (c) forms a surface of the composite film facing or coming in contact with a good to be packaged;
   the layer (b) is disposed between the layer (a) and the layer (c); and
   the layer (d) is disposed between the layer (a) and the layer (c);
   the layer (b) includes a single layer or a plurality of layers (b);
   the layer (d) includes a single layer or a plurality of layers (d);
   a step of stretching the co-extruded or laminated composite film; and
   a step of relaxing the stretched composite film;
   wherein the stretching is bi-axial;
   wherein a stretch factor in a machine direction (MD) is at least 2.0;
   wherein a stretch factor in a transversal direction (TD) is at least 2.0;
   wherein a sum of the stretch factor in the machine direction (MD) and the stretch factor in the transversal direction (TD) is at least 5.0;
   wherein the composite film has a temperature of 70 to 130° C. during stretching;
   wherein a relaxation factor in the machine direction (MD) is more than 0.00;
   wherein a relaxation factor in the transversal direction (TD) is more than 0.00;
   wherein a sum of the relaxation factor in the machine direction (MD) and of the relaxation factor in the transversal direction (TD) is at least 0.05;
   wherein the composite film has a temperature of 60 to 180° C. during relaxation;
   wherein a dwell time during relaxation is at least 2 seconds;
   wherein the dwell time during relaxation is at most 30 seconds;
   wherein a residual stretch factor in the machine direction (MD) is at most 5.0;
   wherein a residual stretch factor in the transversal direction (TD) is at most 5.0;

wherein the layer (a) comprises ethylene-vinyl alcohol copolymer (EVOH) having a density of at least 1.12 g/cm$^3$;

wherein the layer (d) or the plurality of layers (d) each comprises a thermoplastic resin having a density of less than 1.00 g/cm$^3$;

wherein the layer (b) or the plurality of layers (b) comprises a thermoplastic resin having a density greater than 1.00 g/cm$^3$; and wherein the layer (c) comprises a thermoplastic resin having a density of less than 0.95 g/cm$^3$.

3. The method according to claim 1, wherein:

the layer (b) does not contain ethylene-vinyl alcohol copolymer (EVOH); or none of the plurality of layers (b) contains ethylene-vinyl alcohol copolymer (EVOH); or the layer (b) comprises ethylene-vinyl alcohol copolymer (EVOH); or at least one of the plurality of layers (b) comprises ethylene-vinyl alcohol copolymer (EVOH); or none of the layers of the composite film other than layer (a) contains ethylene-vinyl alcohol copolymer (EVOH).

4. The method according to claim 1, wherein:

the ethylene-vinyl alcohol copolymer (EVOH) of the layer (a) has a melting temperature of at least 160° C.; and/or the thermoplastic resin of the layer (c) is a polyolefin having a sealing temperature lower than a sealing temperature of the thermoplastic resin of the layer (a); and/or the thermoplastic resin of the layer (c) is a polyolefin having a melting temperature lower than 120° C.; and/or the thermoplastic resin of the layer (b) has an oxygen permeability of less than 100 cm$^3$/m$^2$·d·bar or the thermoplastic resins of the plurality of layers (b) each or in total have an oxygen permeability of less than 100 cm$^3$/m$^2$·d·bar; and/or the layer (b) comprises an oxygen permeability of less than 100 cm$^3$/m$^2$·d·bar or the plurality of layers (b) each or in total comprise an oxygen permeability of less than 100 cm$^3$/m$^2$·d·bar; and/or the stretching is carried out simultaneously or successively in several stages; and/or the composite film after stretching and relaxation has a shrinkage of less than 0.05 (=5%) in the machine direction (MD); and/or the composite film after stretching and relaxation comprises a shrinkage of less than 0.05 in the transversal direction (TD); and/or the composite film after stretching and relaxation comprises a sum of the shrinkage in the machine direction (MD) and the shrinkage in the transversal direction (TD) of less than 0.05.

5. The method according to claim 1, wherein:

a thickness of the layer (a) does not exceed 20% a thickness of the entire composite film; and/or a thickness of layer (b) or a total thickness of the plurality of layers (b) does not exceed 20% of the thickness of the entire composite film; and/or a mass fraction of layer (a) relative to a total mass of the composite film does not exceed 10%; and/or a mass fraction of layer (b) or a sum of a mass fractions of the plurality of layers (b) does not exceed 10% based on the total mass of the composite film; and/or a sum of the mass fractions of layer (a) and layer (b) or of layer (a) and the plurality of layers (b) does not exceed 10% based on the total mass of the composite film.

6. The method according to claim 1, wherein the layer (a) does not contain at least one of the following types of polymer: a polyester or a polyamide (PA); and/or the thermoplastic resin of layer (c) comprises a polyolefin (PO), a polyethylene (PE) and/or a polypropylene (PP), an ethylene-vinyl acetate copolymer (EVA), an ionomer (IO), an ethylene-methyl methacrylate copolymer (EMMA), an ethylene-methacrylic acid copolymer (EMA), or any mixture thereof.

7. The method according to claim 1, wherein a mass fraction of the layer components with a density>1.0 g/cm$^3$ is 1 to <40% based on the total mass of the composite film.

8. A multilayered, coextruded and/or laminated, biaxially oriented and relaxed composite film manufactured by the method according to claim 1, comprising at least two layers (a) and (c), of which:

the layer (a) forms an outward surface of the composite film; and the layer (c) forms a surface of the composite film facing or coming in contact with a good to be packaged; and wherein the layer (a) comprises ethylene-vinyl alcohol copolymer (EVOH); and wherein the layer (c) comprises a thermoplastic resin.

9. A multilayered, coextruded and/or laminated, biaxially oriented and relaxed composite film manufactured by the method according to claim 1, comprising at least three layers (a), (b) and (c), of which:

the layer (a) forms an outward surface of the composite film;

the layer (c) forming a surface of the composite film facing or coming in contact with a good to be packaged; and the layer (b) is disposed between the layer (a) and the layer (c);

the layer (b) includes a single layer or a plurality of layers (b);

wherein a residual stretch factor of the composite film in a machine direction (MD) is at most 5.0;

wherein a residual stretch factor of the composite film in a transversal direction (TD) is at most 5.0;

wherein the layer (a) comprises ethylene-vinyl alcohol copolymer (EVOH) having a density of at least 1.12 g/cm$^3$;

wherein the layer (b) or the plurality of layers (b) each comprises a thermoplastic resin having a density greater than 1.00 g/cm$^3$; and wherein the layer (c) comprises a thermoplastic resin having a density of less than 0.95 g/cm$^3$.

10. A multilayered, coextruded and/or laminated, biaxially oriented and relaxed composite film, manufactured by the method according to claim 1, comprising at least four layers (a), (b), (d) and (c), of which:

the layer (a) forms an outward surface of the composite film;

the layer (c) forms a surface of the composite film facing or coming in contact with a good to be packaged; and the layer (b) is disposed between the layer (a) and the layer (c);

the layer (d) is disposed between the layer (a) and the layer (c);

wherein the layer (b) includes a single layer or a plurality of layers (b);

wherein the layer (d) includes a single layer or a plurality of layers (d);

wherein a residual stretch factor of the composite film in a machine direction (MD) is at most 5.0;

wherein a residual stretch factor of the composite film in a transversal direction (TD) is at most 5.0;

wherein the layer (a) comprises ethylene-vinyl alcohol copolymer (EVOH) having a density of at least 1.12 g/cm$^3$;

wherein the layer (d) or the plurality of layers (d) each comprises a thermoplastic resin having a density of less than 1.00 g/cm$^3$;

wherein the layer (b) or the plurality of layers (b) each comprises a thermoplastic resin having a density greater than 1.00 g/cm$^3$; and wherein the layer (c) comprises of a thermoplastic resin having a density of less than 0.95 g/cm$^3$.

11. The composite film according to claim 9, wherein:

the layer (b) does not contain ethylene-vinyl alcohol copolymer (EVOH); or none of the plurality of layers (b) contains ethylene-vinyl alcohol copolymer (EVOH); or the layer (b) comprises ethylene-vinyl alcohol copolymer (EVOH); or at least one of the plurality of layers (b) comprises ethylene-vinyl alcohol copolymer (EVOH); or none of the layers of the composite film other than the layer (a) contains ethylene-vinyl alcohol copolymer (EVOH).

12. The composite film according to claim 9, wherein:

the thermoplastic resin of the layer (b) has an oxygen permeability of less than 100 cm$^3$/m$^2$·d·bar or the thermoplastic resins of the plurality of layers (b) each or in total have an oxygen permeability of less than 100 cm$^3$/m$^2$·d·bar; and/or the layer (b) has an oxygen permeability of less than 100 cm$^3$/m$^2$·d·bar or the plurality of layers (b) each or in total have an oxygen permeability of less than 100 cm$^3$/m$^2$·d·bar; and/or a thickness of the layer (b) or the total thickness of the plurality of layers (b) does not exceed 20% of a thickness of the entire composite film; and/or a mass fraction of the layer (b) or a sum of mass fractions of the plurality of layers (b) based on a total mass of the composite film does not exceed 10%; and/or a sum of the mass fractions of the layer (a) and the layer (b) or of the layer (a) and the plurality of layers (b) based on the total mass of the composite film does not exceed 10%.

13. The composite film according to claim 9, wherein the ethylene-vinyl alcohol copolymer (EVOH) of the layer (a) has a melting temperature of at least 160° C.; and/or the thermoplastic resin of the layer (c) is a polyolefin with a sealing temperature lower than a sealing temperature of the ethylene-vinyl alcohol copolymer (EVOH) of the layer (a); and/or the thermoplastic resin of the layer (c) is a polyolefin with a melting temperature of lower than 120° C.

14. The composite film according to claim 9, wherein the composite film after stretching and relaxation has a sum of the shrinkage in the machine direction (MD) and the shrinkage in the transversal direction (TD) of less than 0.05.

15. The composite film according to claim 9, wherein a thickness of the layer (a) does not exceed 20% of a thickness of the entire composite film.

16. The composite film according to claim 9, wherein the layer (a) does not contain at least one of the following types of polymer: a polyester or a polyamide (PA); and/or wherein the thermoplastic resin of the layer (c) comprises a polyolefin (PO), an ethylene-vinyl acetate copolymer (EVA), an ionomer (IO), an ethylene-methyl methacrylate copolymer (EMMA), an ethylene-methacrylic acid copolymer (EMA), or any mixture thereof.

17. The composite film according to claim 9, wherein a mass fraction of the layer components with a density>1.0 g/cm$^3$ is 1 to <40% based on the total mass of the composite film.

18. A use of a multilayered composite film according to claim 8 or of a casing made therefrom for packaging a good, preferably for packaging a food product, a luxury food product or a liquid or solid, in particular powdered, good.

19. The use according to claim 18, wherein a mass fraction of the layer components with a density>1.0 g/cm$^3$ is 1 to <40% based on a total mass of the composite film.

20. A use of ethylene-vinyl alcohol copolymer (EVOH) having a density of at least 1.12 g/cm$^3$ in a layer of a multilayered composite film, according to claim 1, wherein the layer forms an outward surface of the multilayered composite film.

* * * * *